A. GADBOUIS.
End-Gate for Wagons.
No. 210,112.  Patented Nov. 19, 1878.
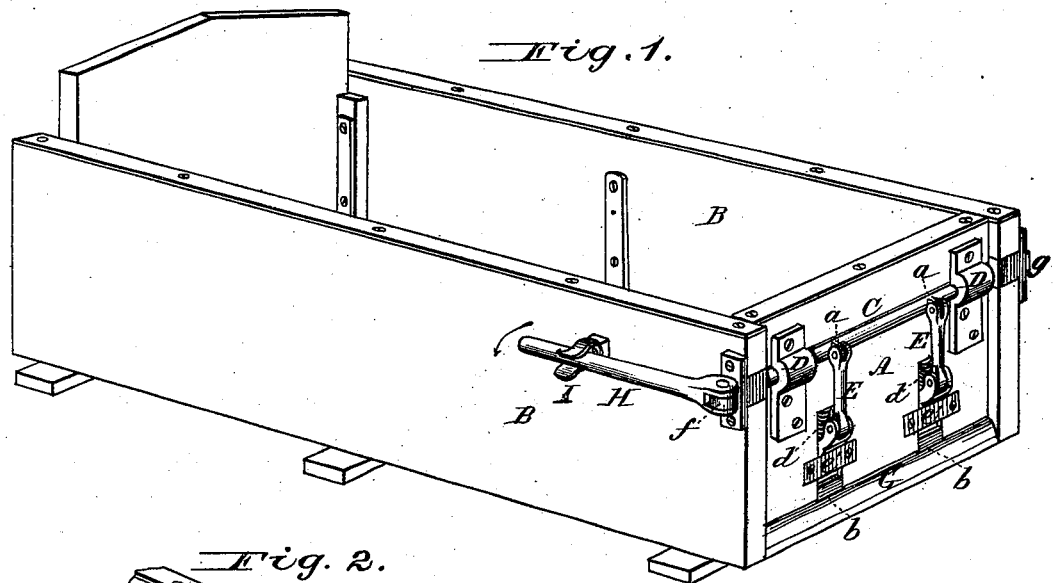
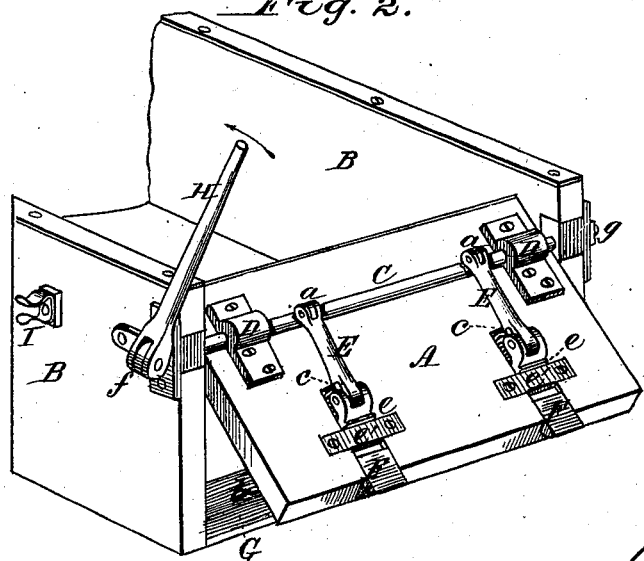
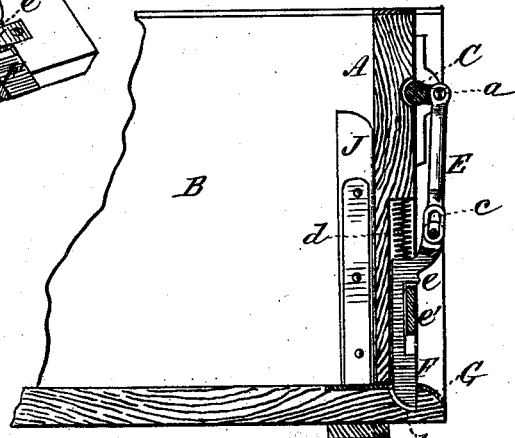
Attest:
H. L. Pevine
Floyd Norris
Inventor.
Adolphus Gadbouis
By Johnson and Johnson
Atty.

UNITED STATES PATENT OFFICE

ADOLPHUS GADBOUIS, OF BOURBONAIS, ILLINOIS.

IMPROVEMENT IN END-GATES FOR WAGONS.

Specification forming part of Letters Patent No. 210,112, dated November 19, 1878; application filed October 14, 1878.

*To all whom it may concern:*

Be it known that I, ADOLPHUS GADBOUIS, of Bourbonais, in the county of Kankakee and State of Illinois, have invented certain new and useful Improvements in End-Gates for Wagons; and I do hereby declare the following to be a full, clear, and exact description of the invention, such as will enable others skilled in the art to which it pertains to make and use it, reference being had to the accompanying drawings, which form part of this specification.

My improvements are adapted for use with end-gates for wagons, arranged to swing open at the bottom upon an upper pivot-rod to facilitate the discharge of the contents while maintaining the fixed attachment of the end-gate to the body of the wagon.

I utilize the pivot-rod of the end-gate as the means of opening and closing the gate by the connection therewith of a crank-lever, in combination with spring-catches connected with said pivot-rod, and adapted to be controlled to unlatch the end-gate by the turning movement of said pivot-rod.

The latching action of the catches is effected by springs adapted to exert a downward force thereon, and which, being compressed by the act of raising the catches from their sockets in the wagon-body, act with an outward force through the catch-connections to thrust open the end-gate suddenly, while the continued lifting of the crank-lever opens the gate to its fullest extent, in which position it is held. The depression of the hand-crank lever closes and latches the gate. The lever therefore, in connection with the end-gate pivot-rod, serves to control the withdrawal of the latches and the opening and closing of the gate by positive movements, the latter of which movements brings the latches in position for automatic latching. The gate pivot-rod connections, with the spring-catches, serve to hold the gate when open.

Referring to the drawings, Figure 1 represents a view, in perspective, of the body of a wagon with my improvements applied to the end-gate thereof and the gate closed; Fig. 2, a similar view, the end-gate being shown as opened by the hand-crank lever, and Fig. 3 a section of the end-gate closed.

The end-gate A is pivoted, at or near its top, to the sides B of the wagon-body by a horizontal rod, C, secured in suitable metallic bearings in the body-sides B, and by boxes D on said gate, so that said rod can have a turning movement independent of the end-gate, and serve as the means of confining the latter in place while allowing it to be opened and closed thereon. This pivot-rod has lugs $a$ projecting outwardly near the gate-bearings D, and vertical rods E are jointed to the lugs, and also to the upper ends of vertically-acting catches F, fitted in recessed guides in the outer side of said gate, so as to project below its lower edge for engaging with sockets $b$ in a bottom end plate, G, which is beveled in a manner to allow the beveled ends of the catches to pass over it into the sockets, to fasten the gate when closed. In this action the catches must rise, and to allow of such movement the lower ends of the rods have slots $c$, through which the catch-joint pins pass, thus allowing said catches to rise and descend in locking the gate while maintaining their connection with the pivot-bar rods. This is important, to allow of the proper operation of a turning end-gate pivot-rod. Springs $d$ are arranged in recesses in the end-gate, so as to bear upon the catches and tend constantly to force them down, while the latter have shoulders $e$ on their outer faces, which strike upon the guide-plates $e'$ to limit their downward projection when the gate is opened, so that said catches will be in position to ride over the end socket-plate in closing the gate, and to enter the sockets by the action of said springs. The pivot-rod has an eyed head, $f$, at one end and a nut, $g$, at the other, by which to secure it to the body-sides and bind them together. A crank-lever, H, is pivoted to the eyed head of the gate-rod C in such manner as to allow it to be turned horizontally thereon through an arc equal to a half-circle, to bring it in position against the outer side of the body, where it is held by clasp or other catch I when the gate is closed, and allow it to be turned outward and backward into the position of a crank to the gate-rod, so that by raising it the gate-pivot rod shall be turned, and, by its lugs $a$ and rods E, lift the catches against the action of their springs, and thus withdraw them from the bottom-plate sockets. The pivot-rod lugs $a$, in this action, act as short cranks, and the springs being compressed will act to force the end-gate open suddenly, as the force of the springs then act directly upon the short crank-lugs, the lever being meanwhile raised, and the gate is thus thrust open and raised to its fullest extent, which is limited by its upper end coming in contact with the upper rounded ends of cleats J on the sides of the body, which, for this purpose, do not extend to the top of the body. These cleats also act to limit the closing of the end-gate, which is effected by bringing down the crank-lever, in which position it is turned out of the way into its holding catch or clasp at the side of the body. In this way the crank-lever withdraws the catches, opens the gate, and serves to close it. The crank for this purpose has a slotted end, which embraces the eyed head $f$ of the gate-pivot rod, so that when turned back it will act, by positive movements, to first turn the pivot-rod to withdraw the catches, and then open and close the gate. When the gate is opened it will be held in such position by reason of the catch-connections with the short lug-cranks of the pivot-rod and the binding action of the pivot-head $f$ and the nut $g$ upon the body-sides. This feature is of much importance, as it relieves the attendant from the necessity of holding the gate open, the springs and latch-connections holding it open automatically. The pivot-rod serves to bind and hold the body-sides firmly together whether the gate be opened or closed.

When the lever is thrown back in the position of a crank to the pivot-rod, it bears against the pivot-rod bearing; but I do not confine myself to this arrangement and connection of the operating-lever, as it may be differently arranged and effect the same results in connection with the pivot-rod and the gate. Indeed, the turning pivot-rod serves, by its spring-catch connections with the gate, to both effect its opening and closing and to hold it open, and any means of operating said pivot-rod will effect this result.

I claim—

1. The gate pivot-rod C, secured to the wagon-sides B B and to the end-gate, free to be turned in its bearings independent of the opening and closing of the gate, in combination with rods having an eccentric or crank connection with said gate pivot-rod, and the catches adapted to be raised by such eccentric connection.

2. The turning pivot-rod C of the end-gate of a wagon, having lug-cranks $a$ connected to fastening-catches F by slotted rods E, substantially as and for the purpose stated.

3. The crank-handle H, pivoted to one end of the gate-rod C, and adapted to be turned thereon into a position as a crank to said gate-rod, for the purpose stated.

4. The combination, with a turning pivot-rod of the end-gate of a wagon, of an operating crank-lever connected with said pivot-rod, whereby the latter is caused to have a turning movement independent of the gate, to effect the withdrawal of the catches and the opening and closing of the gate.

5. Devices for opening, closing, and holding open the end-gate of a wagon, pivoted at or near its upper end, consisting of the vertically-acting catches F, the slotted rods E connecting them with crank-lugs $a$ on the gate-rod C, the springs $d$, arranged to act upon said catch-connections, as described, and a crank-lever, H, connected with and operating said pivot-rod, the catches, and gate, substantially as and for the purpose stated.

In testimony that I claim the foregoing I have hereunto made my mark and seal this 13th day of September, 1878.

ADOLPHUS + GADBOUIS. [L. S.]
his
mark.

Witnesses:
JAMES D. FOX,
NAPOLEOAN LEACRYER.